OR  3,334,957

Aug. 8, 1967   P. M. FIELD   3,334,957
HEAD FOR OVERHEAD PROJECTORS
Filed Jan. 27, 1964   3 Sheets-Sheet 1

PHILIP M. FIELD
INVENTOR.

BY
Rudolph L. Juick
ATTORNEY

Aug. 8, 1967 P. M. FIELD 3,334,957
HEAD FOR OVERHEAD PROJECTORS
Filed Jan. 27, 1964 3 Sheets-Sheet 2
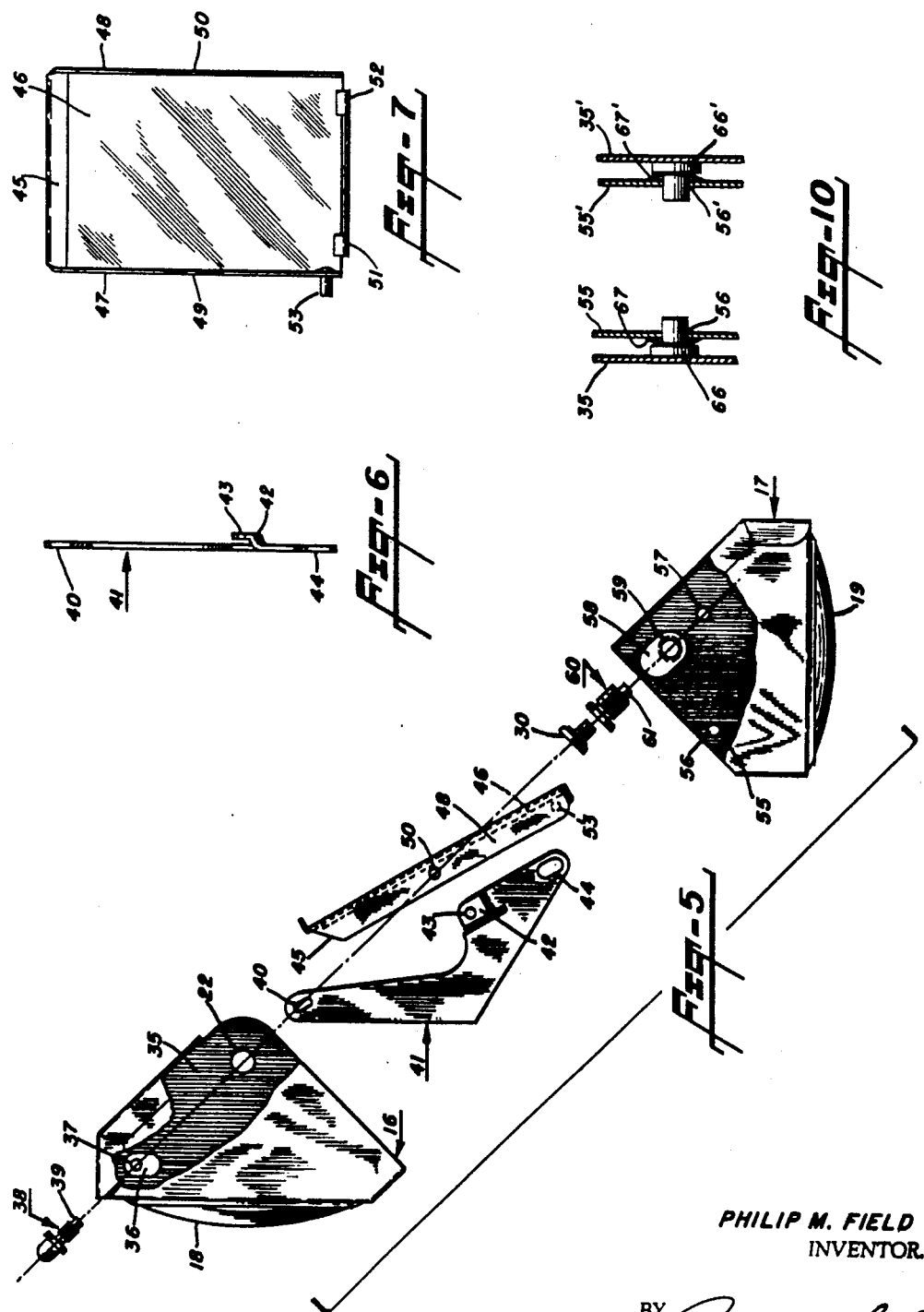
PHILIP M. FIELD
INVENTOR.
BY
Rudolph J. Jurick
ATTORNEY

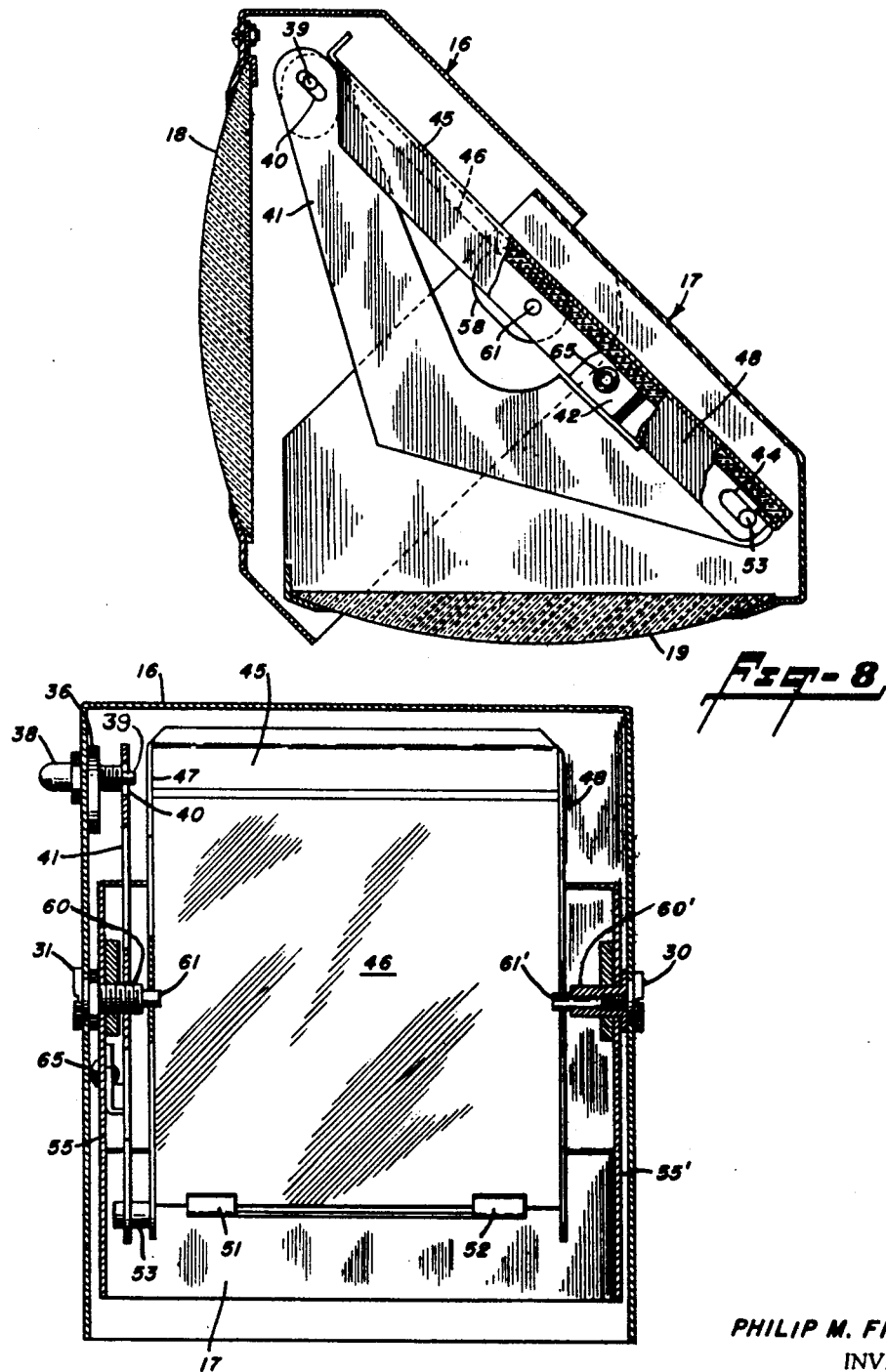

United States Patent Office 3,334,957
Patented Aug. 8, 1967

3,334,957
HEAD FOR OVERHEAD PROJECTORS
Philip M. Field, Maplewood, N.J., assignor to Charles Beseler Company, East Orange, N.J., a partnership
Filed Jan. 27, 1964, Ser. No. 340,473
4 Claims. (Cl. 350—203)

This invention relates to photographic projectors and more particuarly to the construction of a projection head for use on an overhead projector.

Overhead projectors generally comprise a housing which carries a light source and associated optical elements for directing a vertical beam of light through a transparent plate, or projection stage, which plate closes an opening formed in the top wall of the housing. A projection head, carrying a lens, is carried by a carriage, or bracket, that is slidably positionable along a vertical post extending upwardly from the housing.

Associated with the projection head is a mirror which reflects the vertical beam of light to an approximately horizontal path toward a projection screen which usually is disposed in a vertical plane. This mirror, in the past, generally has been located either between the lens and the screen or between the lens and the copy carried by the projection stage. In the former case, the projection lens remains on the vertical optical axis above the projection stage and elevation of the screen image is accomplished by tilting the mirror upwardly through a certain angle, the emerging light beam being deviated through twice the angle of mirror tilt. In the latter case, where the light from the projection stage first strikes the mirror and then passes through the lens, elevation of the mirror requires simultaneous angular movement of the lens in a ratio of two to one, to maintain the optical axis of the lens on the optical axis of the reflected light beam which leaves the mirror.

In either of the above cases, since the light from the projection stage converges toward the lens, the mirror must intercept the cone of light either entering or leaving the lens and, since the base of this cone of light gets larger as the distance from the lens is increased, the size of the mirror must be correspondingly large. This results in a relatively large projection head which tends to be an obstruction to the audience viewing the projected material.

A projection head made in occordance with this invention accomplishes the desired reduction in the size of the head by having the mirror located between two lens elements carried by the head. Thus, the mirror is positioned at a point where the light beam is as small as possible. The two lens elements, making up the lens, are pivoted relative to each other and also relative to the mirror, whereby elevation of the screen image is accomplished by rotating the front lens element upwardly, as required. Such movement of the front lens element automatically imparts rotation to the mirror in the correct one to two ratio.

Briefly, a projection head, constructed in accordance with this invention, comprises a housing formed of two sections pivotally connected together. The housing carries the mirror with the light-reflecting surface on the axis of rotation of the two components of the lens. One housing section is secured to the bracket which is slidably positionable along the vertical post of the projector for focusing the lens assembly. This housing section carries a horizontally disposed lens element, the geometrical center of which is on the optical axis above the projection stage.

The second housing section carries a generally vertically-disposed lens element for completing the optical system of the projection head. This housing section is rotatable, manually, in a vertical plane, to elevate the projected image. Such rotation results in the simultaneous rotation of the mirror between the two lens elements and through an angle equal to one half the angular rotation of the second housing section, thus maintaining the optical axis of the reflected light beam coincident with the geometrical axis of the second lens element.

An object of this invention is the provision of a projection head, for an overhead projector, of improved construction and reduced size.

An object of this invention is the provision of a projection head for an overhead projector, which head carries two lens elements having a light-reflecting mirror positioned therebetween.

An object of this invention is the provision of a projection head, for an overhead projector, carrying a mirror disposed between a pair of lens elements, said head including means for altering the angle between the lens elements and for simultaneously rotating the mirror an angular extent substantially equal to one half the angular change in the relative positions of the said elements.

An object of this invention is the provision of a projection head having a housing formed of two sections pivotally attached together, a lens element carried by each housing section, a mirror disposed within the housing and between the lens elements and means for imparting a predetermined rotation to the mirror upon a given relative rotation of the two housing sections.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 5 is an exploded view showing the various components of the projection head, with certain parts broken away;

FIGURE 6 is a side view of the rocker arm;

FIGURE 7 is a front, elvational view of the mirror and its mounting plate;

FIGURE 8 is a vertical cross-sectional view taken along the lines VIII—VIII of FIGURE 4, and drawn to an enlarged scale;

FIGURE 9 is a vertical cross-sectional view taken along the line IX—IX of FIGURE 2; and FIGURE 10 is a fragmentary, cross-sectional view presented to show the arrangement for frictionally retaining one housing section of the projection head in a desired angular position with respect to the lower housing section.

Figure 1:
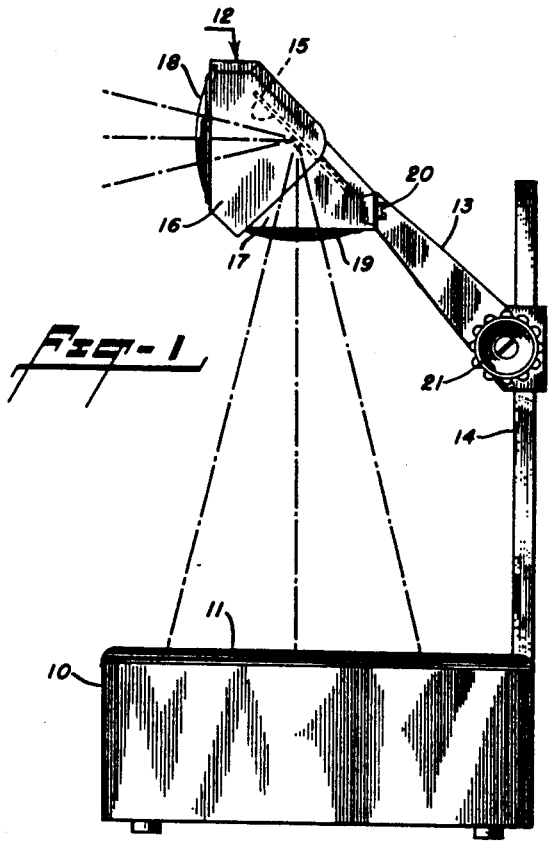
FIGURE 1 is a side elevational view showing an overhead projector of the type to which this invention relates.

Referring, first, to FIGURE 1, there is shown an overhead projector comprising a housing 10, which carries a lamp and associated optical elements from projecting a converging beam of light through a projection stage 11, the latter comprising a flat, transparent plate which supports the material to be projected, such as a photographic transparency. The particular components carried within the housing 10, and the optical arrangement thereof are well known in this art. Suffice to say, the optical arrangement is such that a vertical light beam passes through the transparency and is directed to a projection head 12 carried by a bracket 13 that is slidably carried by the post 14 extending upwardly from the housing 10. The head carries a tilted, light-reflecting mirror 15 for directing the light beam onto a vertical screen. In accordance with this invention, the projection head comprises two housing sections 16 and 17 pivotally connected together, the upper housing section 16 carrying a lens element 18 and the lower housing section 17 carrying a lens element 19. The lower housing section 17 is secured to the mounting bracket 13, as by screws 20, only one of which is visible in the side view of FIGURE 1. Although forming no part of the present invention, the vertical spacing between the projection head 12 and the projection stage 11, for the purpose of focusing the optical image on the screen, is effected by rotation of the knob 21, suitable friction means being provided to retain the head in the adjusted position.

Figure 2:
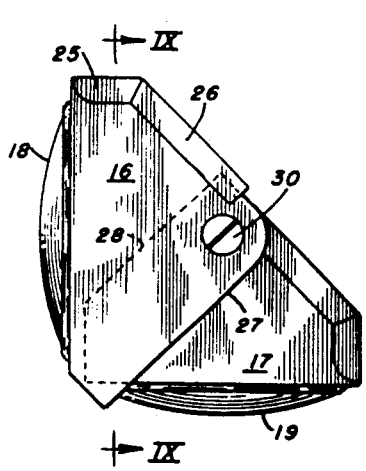
FIGURE 2 is an enlarged side view of the projection head made in accordance with this invention.
Figure 3:
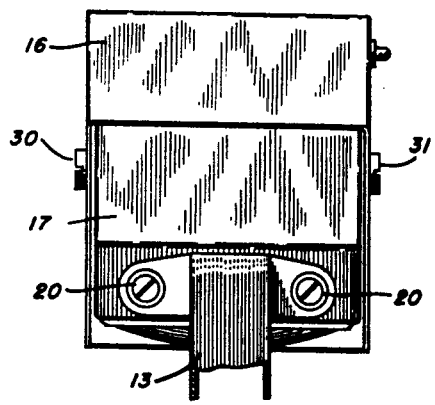
FIGURE 3 is a rear view thereof.
Figure 4:
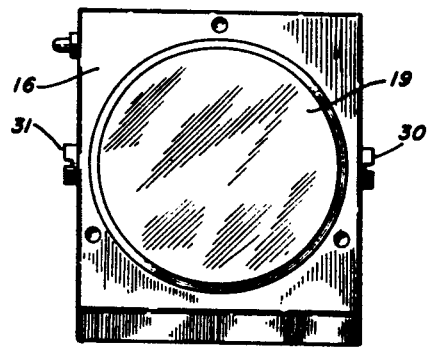
FIGURE 4 is a front view thereof.

Reference, now, is made to FIGURES 2–4, which are side, rear and front views, respectively, of the projection head, drawn to a larger scale than in FIGURE 1. The upper housing section 16, made of sheet metal suitably folded with overlapping end portions 25, 26 for added structural strength, is provided with a circular hole in the front wall for accommodating the lens element 18. The lower housing section 17 is of generally similar construction and is provided with a hole accommodating the lens element 19. It is here pointed out that the width of the upper housing section is greater than that of the lower housing section, whereby the open end 27 of the former is slidably positionable over the open end 28 of the latter. The overlapping walls are pivotally secured together by the aligned screws 30, 31. Included in the rear view of FIGURE 3, is a portion of the bracket 13, which bracket has integral, opposed ears secured to the vertical rear wall of the lower housing section 17 by the screws 20. It will be apparent that with the lower housing section 17 secured to the bracket arm (see FIGURE 1) the upper housing section may be rotated, by hand, in a vertical plane about the axis formed by the screws 30, 31 (see FIGURES 3 and 4) thereby altering the angular disposition of the lens element 18 relative to the lens element 19. If, now, the mirror 15 is also rotated an angular extent equal to one-half that of the lens element 18, the optical axis of the deflected light beam will remain on the optical axis of the lens element whereby elevation of the screen image will not introduce any distortion. Furthermore, if the reflecting surface of the mirror 15 is located on the geometrical axis of the pivot screws 30, 31, then elevation of the screen image will be accomplished without changing the length of the projection path, and, therefore, without disturbing the focus of the image. The mechanism for providing such simultaneous rotation of the mirror will now be described.

Reference, now, is made to FIGURE 5, which is an exploded view showing the components making up the projection head, with the forward side walls of the two housing sections 16 and 17 broken away. The side wall 35 of the upper housing section 16 has a boss 36 soldered, or welded, to the inner surface thereof. A threaded hole 37 is provided through the boss and the side wall to receive the threaded portion of a screw 38. This screw has a hexagonal head and a reduced-diameter tip 39, which tip is adapted to extend through an elongated slot 40 provided in the rocker arm 41, thereby to mechanically couple the rocker arm to the upper housing section 16. The lower portion of the rocker arm is provided with a slot, thereby forming a tab 42, which tab has an offset end portion, as best seen in the side view of the rocker arm shown in FIGURE 6. A hole 43 is formed in the tab 42 and another elongated slot 44 is formed at the lower end of the rocker arm proper.

The mounting plate 45 and the mirror 46 are shown in side view in FIGURE 5 and in front view in FIGURE 7. Such mounting plate has upturned side walls 47, 48, provided with aligned holes 49 and 50, and suitable tabs 51, 52 which overlie the lower edge of the mirror 46. The rear surface of the mirror may be cemented to the underlying wall of the mounting plate, or the mirror may be secured in position by means of conventional retaining clips. Riveted to the side wall 47 is a pin 53, which pin is adapted to extend into the slot 44 of the rocker arm, in the assembled head, thereby mechanically coupling the rocker arm to the mirror.

The side wall 55, of the lower housing section 17, is provided with the holes 56 and 57. A boss 58 is soldered, or welded, to the inner surface of the wall 55 and a threaded hole 59 extends through the boss and the wall for receiving the threaded portion of a screw 60 having a relatively thin hexagonal head and a reduced-diameter tip 61, which tip, in the assembled unit, passes through the hole 49 formed in the adjacent, upturned side wall of the mirror-carrying plate 45. Further, the screw 60 is provided with an axial, threaded hole for receiving the threaded shank of the screw 30. It may also here be pointed out that, in the assembled unit, the hole 57, formed in the side wall of the lower housing section 17, is aligned with the hole 43 formed in the tab 42 of the rocker arm. A rivet passing through these aligned holes pivotally secures the rocker arm to the lower housing section 17, as will be described hereinbelow with reference to FIGURE 8.

The assembly of the parts is shown in FIGURES 8 and 9, to which reference now is made; FIGURE 8 being a vertical, central, sectional view taken along the line VIII—VIII, of FIGURE 4, and FIGURE 9 being a vertical sectional view taken along the line IX—IX of FIGURE 2. It is pointed out that the scale to which FIGURE 9 is drawn is somewhat exaggerated in order to properly show the pivotal assembly of the various components for effecting simultaneous rotation of the mirror and the upper housing section of the head. In assembling the projection head, the tab 42, of the rocker arm 41, is pivotally secured to the side wall of the lower housing section 17 by the rivet 65. Although the rocker arm thereby is secured to the lower housing portion, it is rotatable about the axis of the rivet. Next, the mounting plate 45 (carrying the mirror) is positioned within the lower housing portion with the pin 53 passing through the elongated slot 44 provided at the lower end of the rocker arm. The screws 60 and 61 are now threaded through the aligned threaded holes provided in the side walls of the lower housing section 17. When the heads of these screws abut the housing walls, the tips 61, 61' pass through the aligned holes formed in the upturned side walls 47, 48 of the mirror-carrying plate 45. Thus, the mirror is mounted for rotation about the common axis of the screws 60, 60'.

The open end of the upper housing section 16 now is slidably inserted over the lower housing section until the aligned holes formed in the side walls of the upper housing section are positioned over the heads of the screws 60, 60'. The screws 30 and 31 now are threaded into the axial, threaded holes provided in the respective screws 60, 60'. In actual practice, the screws 60, 60' have relatively thin heads thereby to reduce to a minimum the spacing between adjacent side walls of the two housing sections. Also, the outer screws 30, 31 have smooth-wall shank portions fitting nicely within the corresponding holes formed in the side walls of the upper housing section, thereby providing bearing surfaces for relative rotation of the two housing sections. It will now be clear that the two housing sections and the mirror have a common axis of rotation. The final step in the assembly of the head is the mechanical coupling of the rocker arm to the upper housing section 16 by means of the screw 38. When this screw is fully seated, its tip 39 passes through the elongated slot 40 formed in the rocker arm 41.

As will be seen from FIGURE 8, an angular, clockwise, rotation of the upper housing portion 16 (carrying the forward lens element 18) about the pivotal axis defined by the screw tip 61, imposes a corresponding rotation to the rocker arm about its pivot point, namely, the rivet 65, by reason of the pin and slot coupling at the upper end of the rocker arm. Such rotation of the rocker arm imparts a clockwise rotation to the plate 45 and the mirror (about the common axis defined by the screw tip 61) by reason of the pin and slot coupling at the lower end of the rocker arm. The slots in the rocker arm, the pivot point of the rocker arm, and the pivot point of the mirror all lie in the same plane as the plane of the mirror when the head is set for a 90 degree deflection of the optical axis. The distance between the pivot points 65 and 39 is approximately twice the distance between the pivot points 65 and 53, thereby resulting substantially in a ratio of 2 to 1 between rotation of the lens element 18 and the mirror 46.

Reference, now, is made to FIGURE 10, which is a fragmentary, cross-sectional view showing the side walls 55, 55' of the lower housing section and the spaced overlapping side walls 35, 35' of the upper housing section. Aligned holes 56, 56' are provided in the opposed walls of the lower housing section. The location of these holes in the housing walls will be understood by referring back to FIGURE 5, which shows the hole 56 in the side wall 55 of the lower housing section 17. As has been stated hereinabove, with reference to FIGURE 9, there is a spacing between adjacent side walls of the two housing sections, which spacing is determined by the thickness of the heads of the screws 60, 60'. As shown in FIGURE 10, plastic buttons 66, 66' have shanks passing through the respective holes 56, 56' and are biased outwardly against the overlying walls of the upper housing section by the respective bowed, spring washers 67, 67'. These buttons, made of a suitable plastic, such as nylon, are placed into position before the open end of the upper housing section is slidably inserted over the lower housing section. Once the upper housing section is secured to the lower housing section (by the screws 30, 31, see FIGURE 9), the side walls of the upper housing section overlie the buttons throughout the entire range of angular movement of the upper housing section relative to the lower housing section. Thus, the buttons cannot fall out of place and the friction between the button heads and the overlying walls of the upper housing section is sufficient to retain the upper housing section in the desired angular position relative to the lower housing section, the latter, of course, being retained in fixed position on the bracket extending from the vertical post of the projector.

Having now described the invention, those skilled in this art will be able to make various changes and modifications without thereby departing from the scope and spirit of the invention as recited in the following claims.

I claim:
1. A projection head for an overhead projector comprising,
(a) a first lens mounting means,
(b) a second lens mounting means,
(c) a first lens carried by the first lens mounting means,
(d) a second lens carried by the second lens mounting means,
(e) means pivotally connecting together the said first and second lens mounting means, such means pivotally positioning each of said lenses on substantially the same optical axis at a fixed distance from a main pivot axis perpendicular to the optical axis of such lenses,
(f) a mirror mounting means,
(g) means pivotally supporting said mirror mounting means for rotation about said main pivot axis,
(h) a mirror carried by said mirror mounting means, said mirror reflecting to said second lens light rays received from said first lens,
(i) a one piece rocker arm,
(j) means pivotally and slidably coupling one end of said rocked arm directly to the second lens mounting means so as to afford relative movement between the rocker arm and the second lens mounting means in a plane perpendicular to said main pivot axis,
(k) means pivotally and slidably coupling the other end of said rocker arm directly to the said mirror mounting means so as to afford relative movement between the rocker arm and the mirror mounting means in a plane perpendicular to said main pivot axis, and,
(l) means pivotally securing an intermediate portion of said rocker arm to the said first lens mounting means such that the rocker arm is rotatable relative to such first lens mounting means about a second pivot axis spaced from and parallel to the said main pivot axis, said main pivot axis and second pivot axis lying in a plane substantially parallel to that of the mirror when the two lenses lie in mutually perpendicular planes, the distance between the said second pivot axis and the pivot point of the said one end of the rocker arm being approximately twice the distance between said second pivot axis and the pivot point of the said other end of the rocker arm.

2. The invention as recited in claim 1, wherein the said means pivotally and slidably coupling said one end of the rocker arm to the second lens mounting means comprises a screw passing through a threaded hole formed in the second lens mounting means and having an end extending through a first elongated slot formed in the rocker arm, and wherein the means pivotally and slidably coupling the said other end of the rocker arm to said mirror mounting means comprises a pin secured to the mirror mounting means and extending through a second elongated slot formed in the rocker arm, the said slots lying substantially in the same plane as the main and second pivot axes when the two lenses lie in mutually perpendicular planes.

3. The invention as recited in claim 1, wherein the means pivotally supporting said mirror mounting means comprises a first pair of aligned screws seated in aligned threaded holes formed in said first lens mounting means and having ends extending through spaced, aligned holes formed in said mirror mounting means, and wherein the means pivotally connecting together the first and second lens mounting means comprises a second pair of screws, each screw passing through a hole formed in second lens mounting means and threaded into an axial bore formed in the corresponding screw of the said first pair of screws.

4. The invention as recited in claim 3, including a pair of plastic members having shanks passing through holes formed in the said first lens mounting means and enlarged heads positioned between adjacently-disposed portions of the two lens mounting means, and spring means associated with each of the plastic members and biasing the heads of the plastic members into engagement with the proximate portions of the second lens mounting means.

References Cited
UNITED STATES PATENTS

| | | | |
|---|---|---|---|
| 1,539,579 | 5/1925 | Kucharski | 88—57 |
| 3,126,786 | 3/1964 | Appeldorn | 88—57 |
| 3,191,491 | 6/1965 | Pignone et al. | 88—34 |

JEWELL H. PEDERSEN, *Primary Examiner.*

R. J. STERN, *Assistant Examiner.*